(12) United States Patent
Cheng

(10) Patent No.: US 6,273,402 B1
(45) Date of Patent: Aug. 14, 2001

(54) SUBMERSIBLE IN-SITU OXYGENATOR

(75) Inventor: Alan Tat Yan Cheng, Livingston, NJ (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 09/479,991

(22) Filed: Jan. 10, 2000

(51) Int. Cl.⁷ ............................................. B01F 3/04
(52) U.S. Cl. ........................... 261/36.1; 261/77; 261/93; 261/120; 261/123; 210/242.2
(58) Field of Search ................... 261/36.1, 77, 84, 261/91, 93, 120, 126, DIG. 71; 210/220, 242.2

(56) References Cited

U.S. PATENT DOCUMENTS

| | | | |
|---|---|---|---|
| Re. 32,562 | 12/1987 | Litz | 261/91 |
| 3,722,679 | * 3/1973 | Logue | 261/77 |
| 3,775,307 | 11/1973 | McWhirter et al. | 210/14 |
| 3,846,516 | 11/1974 | Carlson | 261/87 |
| 3,925,522 | 12/1975 | Schreiber | 261/92 |
| 4,358,413 | * 11/1982 | Brucker | 261/91 |
| 4,436,675 | * 3/1984 | Hisao et al. | 261/77 |
| 4,439,316 | * 3/1984 | Kozima et al. | 261/77 |
| 4,540,290 | * 9/1985 | Jarvinen et al. | 261/93 |
| 4,681,711 | 7/1987 | Eaton | 261/91 |
| 4,735,750 | 4/1988 | Damann | 261/29 |
| 4,900,480 | 2/1990 | Litz et al. | 261/36.1 |
| 5,021,154 | * 6/1991 | Haegman | 261/91 |
| 6,050,550 | * 4/2000 | Burgess | 261/91 |
| 6,135,430 | * 10/2000 | Bergman, Jr. et al. | 261/93 |
| 6,145,815 | * 11/2000 | Cheng et al. | 261/93 |

FOREIGN PATENT DOCUMENTS

0583509B1   3/1997   (EP).

* cited by examiner

*Primary Examiner*—C. Scott Bushey
(74) *Attorney, Agent, or Firm*—Bernard Lau

(57) ABSTRACT

An apparatus and method for mixing a gas and a liquid while concomitantly mixing and suspending solids and sludge at the bottom of a deep tank. The present invention includes a gas-liquid aerator which is adapted to be submerged below the surface of wastewater in a deep tank. An expanding high velocity gas-liquid mixture is caused to exit from the bottom of the submerged aerator device with enough force to mix and suspend settling solids and sludge at the bottom of the deep tank.

16 Claims, 3 Drawing Sheets

SUBMERSIBLE IN-SITU OXYGENATOR

FIELD OF THE INVENTION

This invention relates generally to the aeration of liquid and solids and in particular to an apparatus and method for dissolving oxygen in a liquid and the concomitant agitation of liquid and solids holding various chemicals.

DESCRIPTION OF RELATED ART

Aerobic wastewater treatment is a highly economical means to eliminate harmful chemical waste in aqueous systems. Oxygen or air is supplied to the biomass in the wastewater so that toxic or harmful chemicals can be consumed by the biological agents as food to form harmless byproducts. Normally, carbon dioxide and water are the major respiration products.

The cheapest form of an aeration pond is an earth base basin whereby the soil is removed from the surface up to 10 to 15 feet (3.0 to 4.6 meters) below the surface. However, this type of construction poses many potential environmental problems. Hazardous chemical compounds can seep through the bottom of an earth base basin, thereby contaminating the soil or underground water. The Environmental Protection Agency will no longer allow wastewater containing land-banned chemicals, such as benzene, to be treated in these facilities, due to the contamination hazard. Thus, the large shallow earth basin is losing its status as the preferred kind of aeration pond.

The large surface area of an aeration basin is also a gigantic evaporating pond where significant portions of volatile compounds may be evaporated into the atmosphere. With the passage of Clean Air Act, these facilities can no longer rely on evaporation to strip off the volatile compounds as a means to meet regulatory standards. Thus, a number of wastewater treatment facilities are switching to above ground deep tanks. The above ground tanks, with steel bottoms, will not allow toxic chemicals to penetrate the tank and contaminate the surrounding areas and have less surface-to-volume ratio for fugitive emissions. In Europe and Asia, deep tanks are much more popular.

Supplying oxygen to such deep tanks is a challenge with conventional wastewater aeration devices. Surface aerators can only provide a sufficient supply of oxygen to the top layer of the whole wastewater tank. Fine bubble diffusers require a large amount of horsepower to compress the air and overcome the hydrostatic head of the aerators.

Bacteria or biomass grows inside the wastewater treatment tank while consuming hazardous waste. The bacteria or biomass is called sludge, and forms a wet solid upon separation from the wastewater. Generally, the means of separation is typically centrifuge or filtration. Part of the sludge must be recycled back to the aeration tank to keep the biomass concentration significantly high, as the incoming water will dilute the tank content. To allow the biomass to function properly, the sludge must be adequately suspended, or segregation will occur, resulting in poor biodegradation of the waste. Prior art surface aeration devices do not effectively address the issue of sludge at the bottom of a deep tank. A deep tank generally has a depth in the range of about 30 to 100 feet (9.1 to 30 meters), with an average depth being in the range of 40 to 50 feet (12 to 15 meters).

Surface aerators, such as disclosed in U.S. Pat. No. 4,681,711, are only effective to a depth of about 10 feet (3.1 meters). The use of a downward pumping impeller, as disclosed in U.S. Pat. No. Re 32,562, to enhance the dissolution of oxygen from an overhead space, has limited effectiveness in a deep tank. Since the device is fixed on the reactor vessel, it is not possible to optimize solid suspension. Prior art devices using this technology require an increase in the agitation speed in order to increase the liquid velocity exiting from the draft tube. However, there are practical limitations as how fast a helical impeller can rotate. Commercial bearings for large 24-inch (61 cm) impeller systems can rotate at 300 to 400 rpm before vibrations and other mechanical problems destroy the bearing and gearbox. Larger 36-inch (92 cm) impellers may rotate at 250–300 rpm. Even if the mechanical difficulties are overcome, the system will require tremendous amount of power for the agitation. In many instances, the power required for agitation sufficient to suspend the solid and sludge is 3–4 times that required for oxygenation. Much of this power is wasted. It does not make sense to waste this energy while the oxygen dissolution function requires only a small amount of energy.

The reason for the extreme higher power requirement for agitation is that the oxygen bubbles have an upward momentum due to buoyancy forces. The downward pumping impeller carries the oxygen bubbles downward in a jet stream formation. The upward buoyancy force is countercurrent to the downward liquid momentum. The further the gas-liquid stream travels downward, the weaker the momentum of the liquid becomes. The jet stream is also spread outward, reducing its velocity. At one point, the jet stream will weaken to a point that it can no longer carry the oxygen bubbles downward. At this stage, the oxygen bubbles will segregate from the liquid jet and move upward in reverse. The liquid jet is so weak that it will not be able to travel any further or provide agitation to the bottom part of the tank.

Another alternative to the extreme high agitation rate is to provide a separate mechanical agitation system in conjunction with the surface aeration device. The mechanical agitation system is installed on the side and in the bottom of the tank to provide agitation and solid suspension. However, significant power is still required to drive the agitator at the bottom of the tank, increasing capital expenditure.

Bearing in mind the problems and deficiencies of the prior art, it is therefore an object of the present invention to provide an apparatus and method to aerate wastewater in a deep tank.

It is another object of the present invention to provide an apparatus and method to agitate solids in a deep tank.

A further object of the invention is to provide an apparatus and method to concomitantly aerate liquid and agitate solids in a deep tank.

It is another object of the present invention to provide an apparatus and method to aerate liquid and agitate solids in a deep tank using the minimum energy required.

SUMMARY OF THE INVENTION

The above and other objects and advantages, which will be apparent to one of skill in the art, are achieved in the present invention which is directed to an apparatus and method for the dissolution of a gas and suspension of a settling solid in a body of liquid. The apparatus is adapted to be submerged in the body of liquid and comprises a collector, a fluid pump and a ballast chamber which is adapted to allow the apparatus to float or sink in the body of liquid. The collector is adapted to capture an undissolved gas rising towards the surface of the body of liquid and direct the undissolved gas towards a headspace of the apparatus. The fluid pump, such as an impeller or jet pump, is adapted to draw in a feed gas from a feed gas inlet together with the undissolved gas and liquid and directs a high velocity gas-fluid mixture downwardly in the body of liquid. In the preferred embodiment, the ballast chamber is adapted to be filled with a ballast such as water to sink the apparatus and filled with a gas to raise the apparatus in the body of liquid.

In the preferred embodiment, the collector to capture an undissolved gas comprises a surface of the chamber. The surface of the chamber should be of a sufficient size to capture the undissolved gas and have a plane which is sufficiently angled to direct the undissolved gas toward the headspace, and a vortex formed by the impeller.

In the preferred embodiment, the fluid pump comprises an impeller connected to a rotatable shaft disposed within a draft member. The draft member is adapted to draw the gas and liquid from the body of liquid into the draft member through an opening near the top of the draft member above the impeller and to exit through a second opening at a lower end of the member. The impeller is connected to the shaft and adapted to draw the gas and liquid into the draft member towards the impeller and cause the gas-liquid mixture to exit the draft member at a high velocity. The impeller may be a high capacity impeller, a gas dispersion impeller, particularly that which is helical in shape and adapted to circulate large volumes of the gas and the liquid. The feed gas stream is directed into a headspace above the impeller through a feed gas inlet. The feed gas stream may also be introduced directly into a vortex formed by the impeller as it rotates into the liquid. In the most preferred embodiment, a turbulent promoter to increase the turbulent mixing of the gas-liquid mixture may be connected to the shaft.

In another aspect, the apparatus comprises an adjustable jet aerator, a venturi tube, a conduit, a ballast chamber adapted to lower and raise the apparatus, and a collector adapted to trap an undissolved gas in the body of liquid and direct it to a headspace.

In the preferred embodiment, the jet aerator comprises a pump adapted to draw in through an inlet a liquid from the body of liquid and eject the liquid through an outlet at a high velocity. In the preferred embodiment, the venturi tube may be connected to the jet aerator and may include a tapered mean which is adapted to receive the liquid at a high velocity from the aerator. A pipe may be connected at one end to a throat of the venturi tube with the other end of the pipe adapted to draw in a mixture of gas such as fresh oxygen and undissolved oxygen from the headspace below the venturi tube and feed the gas mixture back to the venturi tube.

In the preferred embodiment, the conduit may be a flexible hose and supplies a second gas to the headspace.

In the preferred embodiment, the ballast chamber comprises at least one hollow chamber connected to the apparatus. The chamber is adapted to be filled with a ballast, such as water, to sink the apparatus and a ballast, such as air, to raise the apparatus in the body of liquid. It is also preferred that the collector comprises a surface of the ballast chamber and have a surface having a sufficient size to trap the undissolved gas rising in the body of liquid, and be angled to direct and trap the captured undissolved gas towards the headspace.

In a further aspect, the present invention provides a method of aerating a body of liquid and suspending settling solids in the body of liquid. The method comprises the steps of providing a submergible aerator, submerging the aerator below a surface of the body of liquid, introducing a gas stream into the body of liquid, and causing the aerator to mix the gas stream and body of liquid. In the preferred embodiment, the aerator generates a high velocity gas-liquid jet into the body of liquid which has sufficient force to suspend the settling solids in the body of liquid.

In the preferred embodiment, the depth of the submerged aerator is adjusted to optimize the suspension of the settling solids in said body of liquid. In yet another preferred embodiment, the depth of the apparatus is adjusted by filling a ballast chamber with a ballast causing the chamber to sink until it reaches the desired depth.

In another preferred embodiment, the undissolved gas rising towards the surface of the body of liquid is captured by a collector and recirculated into the gas-liquid jet.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
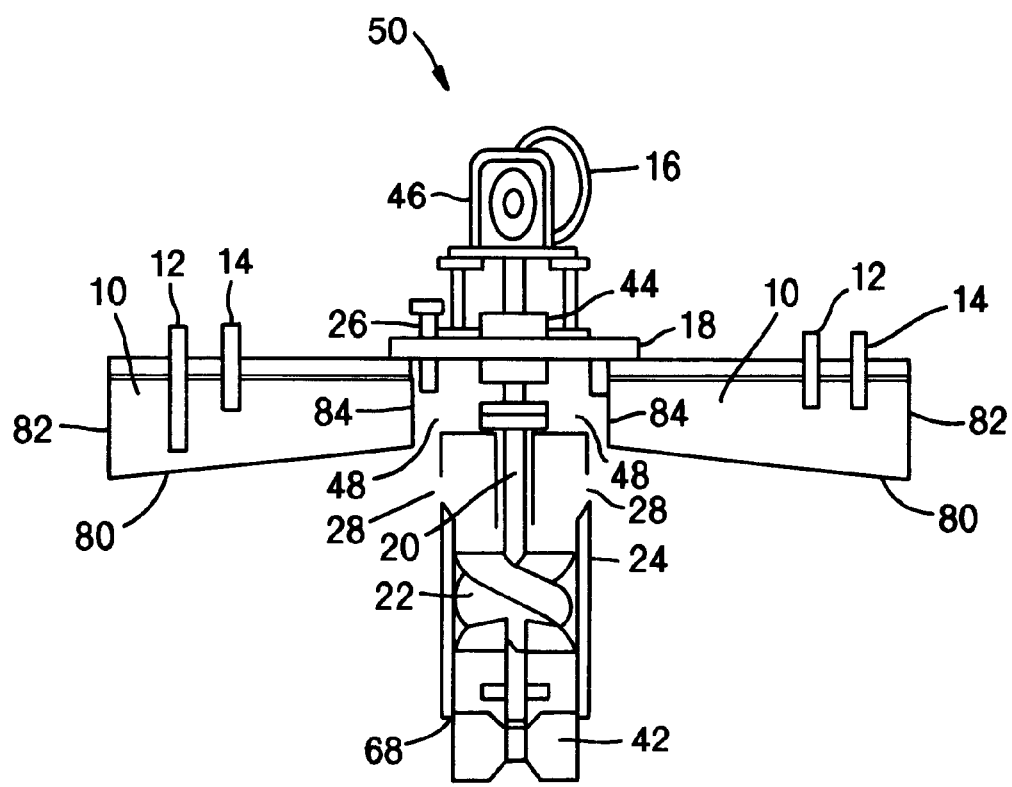
FIG. 1 is a side view of the apparatus of the present invention.

In describing the preferred embodiment of the present invention, reference will be made herein to FIGS. 1 to 3 of the drawings in which like numerals refer to like features of the invention. Features of the invention are not necessarily shown to scale in the drawings.

Figure 2:
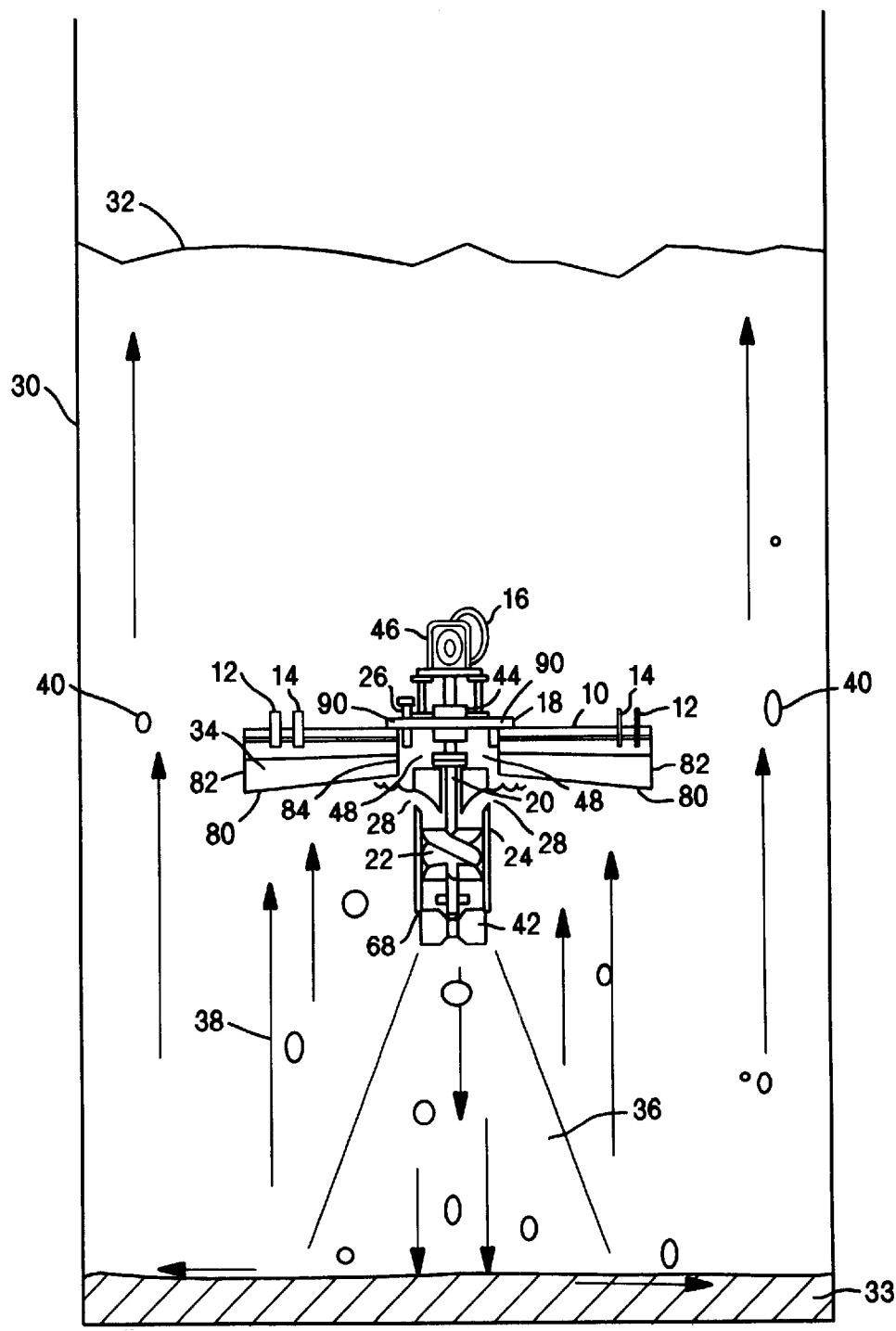
FIG. 2 is a side view of the apparatus of the present invention submerged in a deep tank.

As shown in FIGS. 1 and 2, the apparatus of the present invention comprises a gas-liquid aerator device 50, adapted to be submerged in deep tank 30 containing liquid 32 and solid 33. In the preferred embodiment, liquid 32 is wastewater and solid 33 is sludge formed in deep tank 30. Device 50 includes a fluid pump, such as an impeller, a jet flow pump or a positive displacement device, which can draw in a liquid and a gas, and cause the movement of the liquid and gas downwardly at a high velocity. In the preferred embodiment, device 50 comprises a submergible motor 16 connected to motor support plate 18 and a rotatable shaft 20. An impeller 22 is connected to shaft 20, and impeller 22 and shaft 20 are preferably disposed within draft tube 24.

In draft tube 24, at least one opening 28 formed therein to allow the passage of liquid 32 and a gas, such as oxygen, into tube 24, and at least one second opening 68 to allow a gas-liquid mixture 36 to exit tube 24 after it passes through impeller 22. Opening 28 is preferably positioned at a point above impeller 22, while opening 68 is positioned below impeller 22, preferably at the bottom of draft tube 24.

Device 50 further comprises at least one ballast chamber 10 adapted to be filled with a ballast to sink the apparatus below the surface liquid 32. Chamber 10 is preferably a hollow, stainless steel float, and is totally sealed with the exception of fluid valve 12 and air valve 14 to allow the flow of ballast into and out of ballast chamber 10. Fluid valve 12 allows the passage of a fluid ballast, preferably water, into and out of chamber 10. Air valve 14 allows the passage of a gas ballast, preferably air, into and out of chamber 10. The introduction of fluid into chamber 10 causes it to sink, while the introduction of air causes chamber 10 to rise, in liquid 32.

In the preferred embodiment, the bottom surface 80 of chamber 10 is conically shaped or angled such that the outer edge 82 of chamber 10 is wider than inner edge 84 of chamber 10. Chamber 10 is of a sufficient size and shape so that undissolved gas 38 rising upwards in liquid 32 is trapped by the bottom surface 80 of chamber 10 and the shape or angle directs the undissolved gas 38 towards headspace 48 and opening 28. While it is preferred that the shape of chamber 10 be adapted to capture undissolved gas particles 38 rising upwards in liquid 32, it is possible to use other devices or means to capture and direct the undissolved gas particle towards headspace 48. These devices may include baffles, wings, partitions or electromechanical devices which capture the rising undissolved gas 38 and directs it toward headspace 48.

Motor 16 is preferably an electrical or air motor. In the preferred embodiment, motor 16 drives gear box 46, which is connected to shaft 20. Shaft 20 passes through seal 44, motor support plate 18 and into draft tube 24.

Seal 44 is used to position shaft 20 in, and protect shaft 20 from, motor support plate 18 while allowing shaft 20 to rotate freely. Impeller 22 is fixedly connected to shaft 20 within draft tube 24 and is preferably a downward pumping high capacity or gas dispersion impeller. In the preferred embodiment, impeller 22 is helical in shape, in order to circulate large volumes of gas and liquid. Optionally, turbulent promoters or turbines 42 can be added to shaft 20 in order to increase the turbulent mixing of gas and liquid.

In the preferred embodiment, conduit 26 passes through motor support plate 18 into headspace 48. This area between edges 84 is referred to as headspace 48 and allows for the accumulation of a gas therein. Conduit 26 may extend below the bottom of edge of motor support plate 18 and is used to introduce a gas, preferably oxygen, into headspace 48. In the preferred embodiment, oxygen is supplied to conduit 26 going through motor support plate 18. The oxygen is supplied to headspace 48 above draft tube 24, so that the vortex induced by rotating impeller 22 can draw a gas-liquid mixture down draft tube 24 through opening 28. Conduit 26 may also extend below the surface of liquid 32 so that the oxygen can be fed directly into the vortex formed by rotating impeller 22.

During operation, apparatus 50 is caused to sink below the surface of liquid 32. Any conventional means may be used to cause apparatus 50 to sink. In the preferred embodiment, apparatus 50 is caused to sink by filling ballast chamber 10 with ballast 34. Ballast chamber 10 may comprise a hollow chamber or floatation device which is capable of being filled with ballast 34. Ballast chamber 10 is of a sufficient size so that when filled, even partially, with ballast 34, apparatus 50 sinks below the surface and into liquid 32. Ballast 34 is preferably a fill liquid, such as water, and is preferably introduced into ballast chamber 10 via fluid valve 12. The air displaced from ballast chamber 10 by ballast 34 can be released via air outlet 14. Both water valve 12 and air valve 14 may be connected to supply hoses in order to enable filling and evacuation procedures while apparatus 50 is submerged. Each of valves 12 and 14 may be regulated and monitored to ensure an equal volume of fluid intake and air release in chamber 10, particularly if more than one chamber 10 is used. As ballast 34 fills chamber 10, apparatus 50 will sink below the surface of wastewater 32 into deep tank 30. To raise apparatus 50, air is filled into chambers 10 via air valve 14. This forces the ballast out of chamber 10 through valve 12, which is preferably a dip tube. Using this method, the depth of apparatus 50 inside tank 30 is easily adjusted. The position of chamber 10 should allow device 50 to be lowered and raised in a level and uniform manner.

Since a rotating helical impeller will create upward thrust, it is necessary to activate motor 16 before final depth adjustment. Also, the gas flow to conduit 26 needs to be turned on. Increasing the oxygen in headspace 48 will also add to the buoyancy of the apparatus. After apparatus 50 is running steadily, final adjustment is made by adding more ballast 34, preferably air or water, into chamber 10. Guide cable or guide rods 90 can be attached to apparatus 50 so that the submerged device can be centered at the desired location within tank 30.

Rotating impeller 22 will draw oxygen and wastewater 32 into draft tube 24 via opening 28. Gas-liquid mixture 36 will exit draft tube 24 as high velocity jet, which preferably expands at an angle of about 20 degrees. Based on conservation of momentum, jet 36 will reduce in velocity with the expansion. The depth of apparatus 50 in deep tank 30 is adjusted so that gas-liquid jet 36 will still have sufficient velocity to mix and suspend the settling solids and sludge 33 at the bottom of tank 30. Samples may be taken at different depths of tank 30 to ensure that the solid and sludge are properly suspended. The rotational speed of impeller 22 is totally independent of the requirement of solid suspensions.

By submerging apparatus 50 in wastewater 32 contained in deep tank 30, unexpected advantages are realized over a surface floating aerator because of additional hydrostatic head for mass transfer. The oxygen solubility is higher under pressure so the oxygen transfer rate will increase as apparatus 50 sinks deeper into tank 30.

The oxygen utilization rate also increases by submerging apparatus 50 in wastewater 32. Generally, the undissolved gas, oxygen bubbles 38 from jet 36 will rise and, in the preferred embodiment of the invention, be recaptured and directed toward draft tube 24. The vortex induced by impeller 22 causes these oxygen bubbles 38 to be drawn in through opening 28 and re-circulated through impeller 22. However, a certain percentage of the oxygen bubbles 40 will escape around chamber 10 without being captured and re-circulated. Even though some amount of oxygen bubbles 40 may escape around the submerged chamber, in the deep tank, the escaping oxygen bubbles 40 still have a long way to travel upwards before reaching the surface of liquid 32. Therefore, less than half of the escaping oxygen bubbles 40 may actually reach the liquid surface. This improves the oxygen utilization rate. Furthermore, the escaping oxygen bubbles 40 will also provide some agitation and oxygenation to the upper part of the deep tank.

With the present invention, the power input and rotational speed of apparatus 50 can be optimized based on oxygen demand. This is independent of solid suspension requirements. Therefore, both capital and power cost are largely reduced in this invention.

Figure 3:
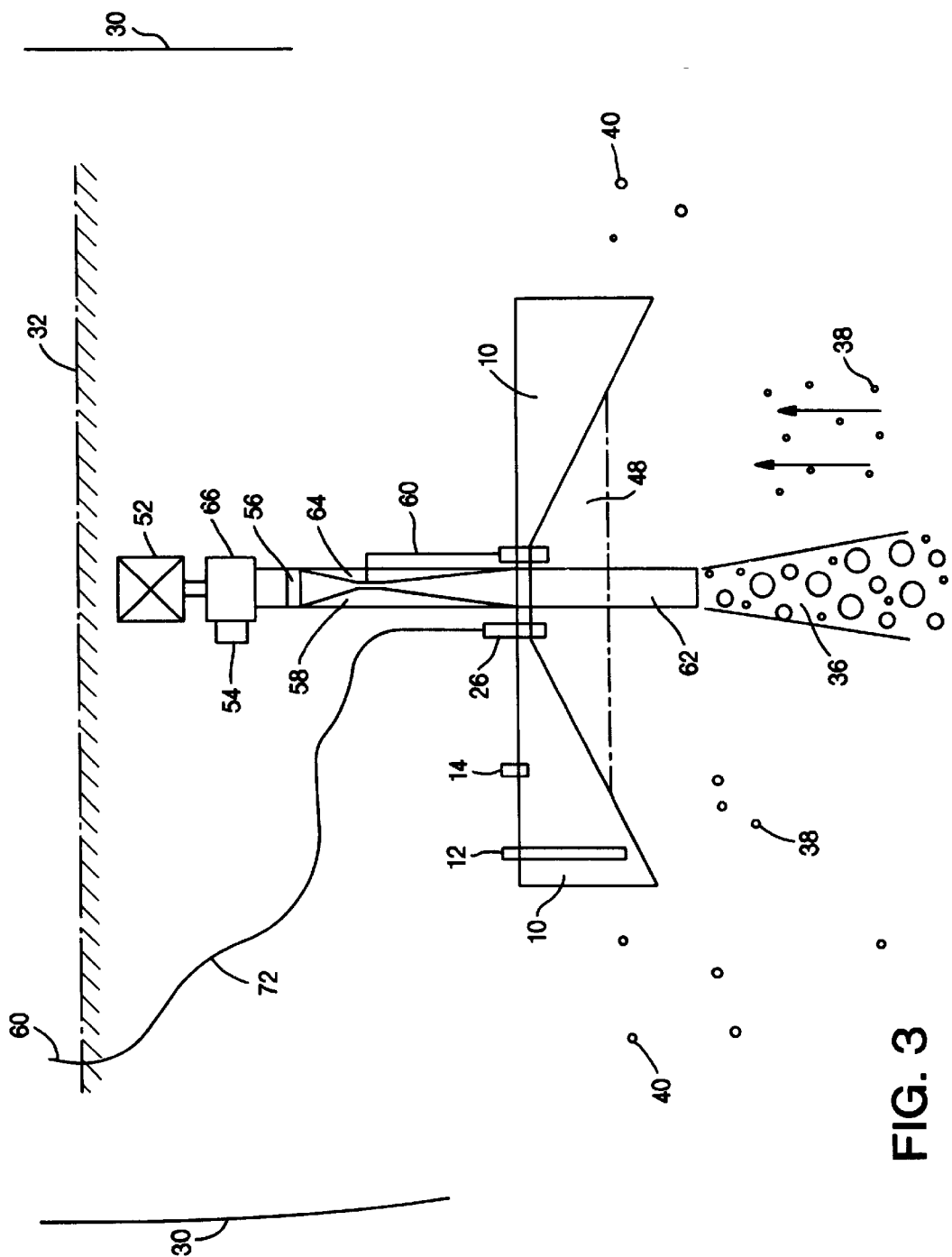
FIG. 3 is a side view of a jet-aerator apparatus of the present invention.

In another aspect of the present invention, an adjustable jet aerator 70 may be installed on a submersible hollow float 10, or ballast chamber, with the jet 56 pointing downwards to entrain oxygen, as shown in FIG. 3. Different from fixed position jet aerators, the adjustable jet aerator provides the flexibility of changing mixing intensity at the tank bottom due to changing solid loading and process conditions.

While in this embodiment, ballast chamber 10 is shown as a single chamber, chamber 10 may also comprise one or more hollow chambers. As shown in FIG. 3, in the preferred embodiment, the shape of chamber 10 is used to capture undissolved gas particles rising upward in the liquid 32 and direct them to headspace 48. As before, any means may be used to capture these particles, and is not dependent on the shape of chamber 10.

As shown in FIG. 3, liquid momentum is provided by pump 66, driven by motor 52. Pump 66 for the jet aerator can be mounted on top of the float 10 or out of liquid 32. Liquid 32 is drawn into pump 66 through inlet 54 from a waste water treatment pond or deep tank 30. Liquid is ejected from pump 66 at high pressure through pump outlet 56 (e.g., 15 to 200 psig) and is passed through a venturi 58. The tapered mean of venturi 58 converts to potential energy and to kinetic energy so that the pressure decreases while the velocity increases to a maximum. In fact, the pressure can have a negative drop such that a vacuum is created at the throat of venturi 58. Pipe 60 can be used to connect the headspace 48 under chamber 10 to the throat 64 of the venturi 58, so that a vacuum formed can draw the gas from headspace 48 into venturi 58, forming a two-phase flow.

Oxygen is supplied through a flexible oxygen hose 72 to an inlet 26 on top of chamber 10. The oxygen can be injected directly into headspace 48 or it can also be injected directly into liquid 32, for example, with a sparger. The fresh oxygen supplied through flexible oxygen hose 72 into headspace 48 will mix with the recycled oxygen generated from any undissolved oxygen bubbles 38 rising upward in liquid 32 that are captured and redirected toward headspace 48. The pressure in headspace 48 under chamber 10 will depend upon the depth of the unit under the surface of liquid 32. The amount of oxygen (fresh and recycled) entering venturi 58 will vary, but the speed of pump 66 can be adjusted to meet different oxygen dissolution demands.

At extreme depths (e.g., greater than 100 ft.) recycled oxygen is no longer needed and fresh oxygen can be feed directly into venturi 58. Alternatively, venturi 58 is not needed because fresh oxygen can be fed under pressure directly into pump discharge pipe 56 to form gas liquid jet 36.

Thus, the present invention provides an apparatus and method of concomitantly aerating and agitating wastewater and solids in a deep tank using the minimum energy required.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An apparatus for the dissolution of a gas and suspension of a settling solid in a body of liquid, said apparatus adapted to be submerged in said body of liquid, said apparatus comprising:
   a) a collector adapted to capture an undissolved gas rising toward a surface of said body of liquid, said collector adapted to direct said captured undissolved gas toward a headspace of said apparatus;
   b) a fluid pump adapted to draw a feed gas from a feed gas inlet, together with said undissolved gas and said liquid toward said pump, and direct the passage of a gas-liquid mixture downwardly in said body of liquid; and
   c) at least one ballast chamber connected to said apparatus, said ballast chamber adapted to be filled with a first ballast to cause said apparatus to sink into said body of liquid, and filled with a second ballast to cause said apparatus to rise upwardly in said body of liquid.

2. The apparatus of claim 1 wherein said gas-liquid mixture moves downwardly in said body of liquid at a high velocity.

3. The apparatus of claim 1 wherein said fluid pump comprises an impeller connected to a rotatable shaft disposed within a draft member.

4. The apparatus of claim 1 wherein said fluid pump comprises a jet pump.

5. The apparatus of claim 1 wherein said collector comprises a surface of said ballast chamber, said surface being of a sufficient size to capture said undissolved gas, said surface having a plane which is sufficiently angled to direct said undissolved gas toward said headspace.

6. The apparatus of claim 3 wherein said draft member is adapted to have at least one first opening at an upper end of said member and at least one second opening at a lower end of said member, said first opening being positioned at a point above said impeller and below the surface of said body of liquid, said first opening adapted to draw said undissolved gas, said feed gas and said liquid into said draft member toward said impeller.

7. The apparatus of claim 3 further including at least one turbulent promotor fixedly connected to said shaft, said promotor adapted to increase the turbulent mixing of said gas-liquid mixture.

8. The apparatus of claim 3 wherein said impeller is a high capacity impeller.

9. The apparatus of claim 3 wherein said impeller is a gas dispersion impeller.

10. The apparatus of claim 3 wherein said impeller is helical in shape and adapted to circulate large volumes of said gas and said liquid.

11. The apparatus of claim 3 wherein said feed gas inlet is positioned to introduce said feed gas directly into a vortex formed by said impeller as it rotates in said body of liquid.

12. An apparatus for the dissolution of a gas and suspension of a settling solid in a body of liquid, said apparatus adapted to be submerged in said body of liquid, said apparatus comprising:
   a) an adjustable jet aerator, said aerator adapted to draw in a liquid from said body of liquid and eject said liquid at a high velocity;
   b) a venturi tube connected to said jet aerator, said venturi tube having a tapered means and adapted to receive said liquid at a high velocity from said aerator;
   c) a pipe connected at its first end to a throat of said venturi tube, a second end of said pipe adapted to draw in a first gas from a headspace below said venturi tube and feed said first gas back to said venturi tube;
   d) a conduit to supply a second gas to said headspace;
   e) a ballast chamber attached to said apparatus, said ballast tank adapted to be filled with a first ballast to cause said apparatus to sink into said body of liquid and a second ballast to cause said apparatus to rise in said body of liquid; and
   f) a collector to trap an undissolved gas rising from said body of liquid and direct said undissolved gas into said headspace.

13. The apparatus of claim 12 wherein said collector comprises a surface of said ballast chamber, said surface having a sufficient size to trap said undissolved gas, said surface having an angled plane to direct said undissolved gas toward said headspace.

14. The apparatus of claim 12 wherein said jet aerator comprises a pump having an inlet to draw in said liquid from said body of liquid and an output to eject said liquid at a high velocity.

15. The apparatus of claim 12 wherein said conduit comprises a flexible hose.

16. The apparatus of claim 12 wherein said pipe draws in a mixture of fresh oxygen and undissolved oxygen from said headspace and feeds said mixture into said venturi.

* * * * *